they are dropped.

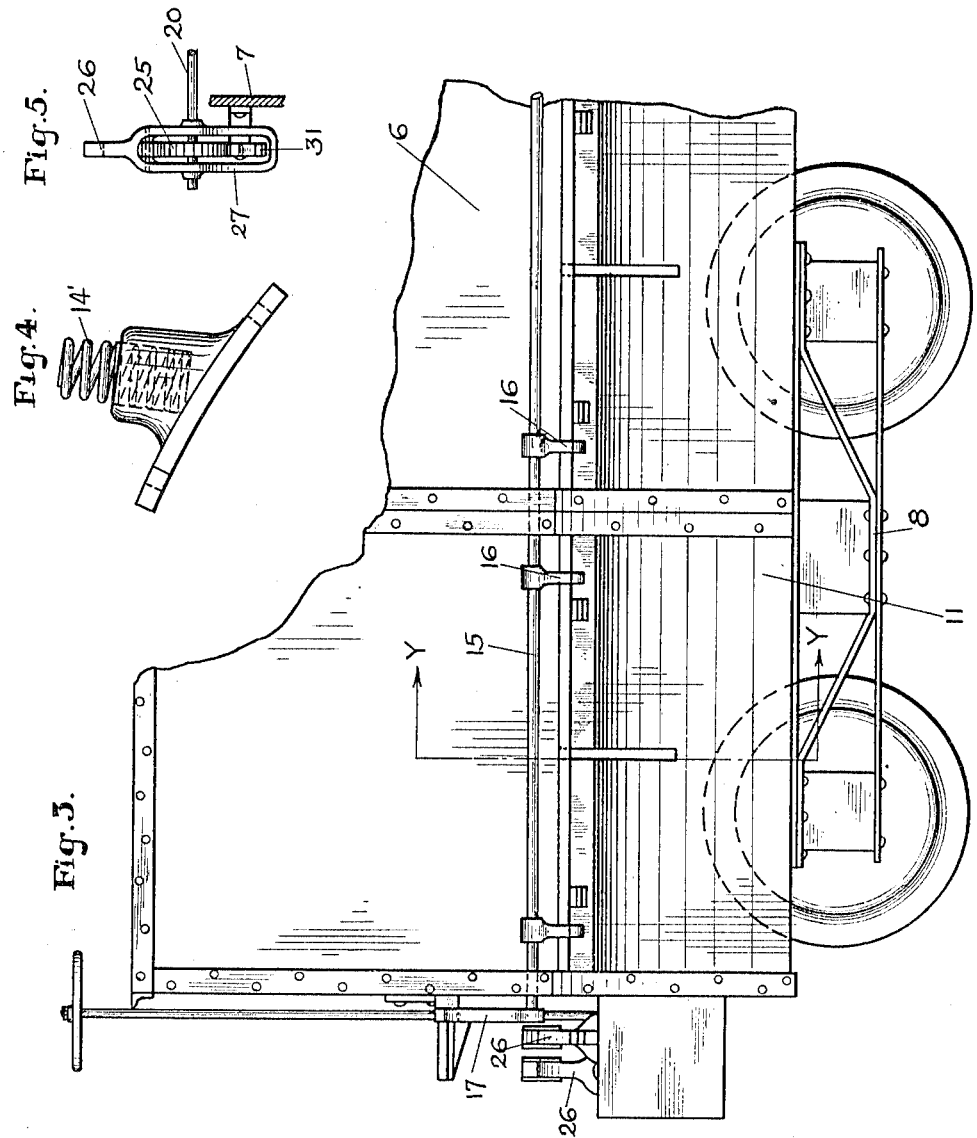

UNITED STATES PATENT OFFICE.

RICHARD W. ERICSON, OF CHICAGO, ILLINOIS.

CAR-DOOR-CLOSING MECHANISM.

1,072,106.  Specification of Letters Patent.  Patented Sept. 2, 1913.

Application filed May 10, 1912. Serial No. 696,344.

*To all whom it may concern:*

Be it known that I, RICHARD W. ERICSON, a citizen of the United States, and a resident of the city of Chicago, county of Cook, and State of Illinois, have invented certain new and useful Improvements in Car-Door-Closing Mechanism, of which the following is a specification.

My invention relates to means for closing and locking car doors and particularly to the type of cars known as gondola cars, and the object is to provide a device of the character mentioned, which will be simple of construction and efficient in operation.

The invention consists in the combinations and arrangements of parts hereinafter described and claimed.

Figure 1:
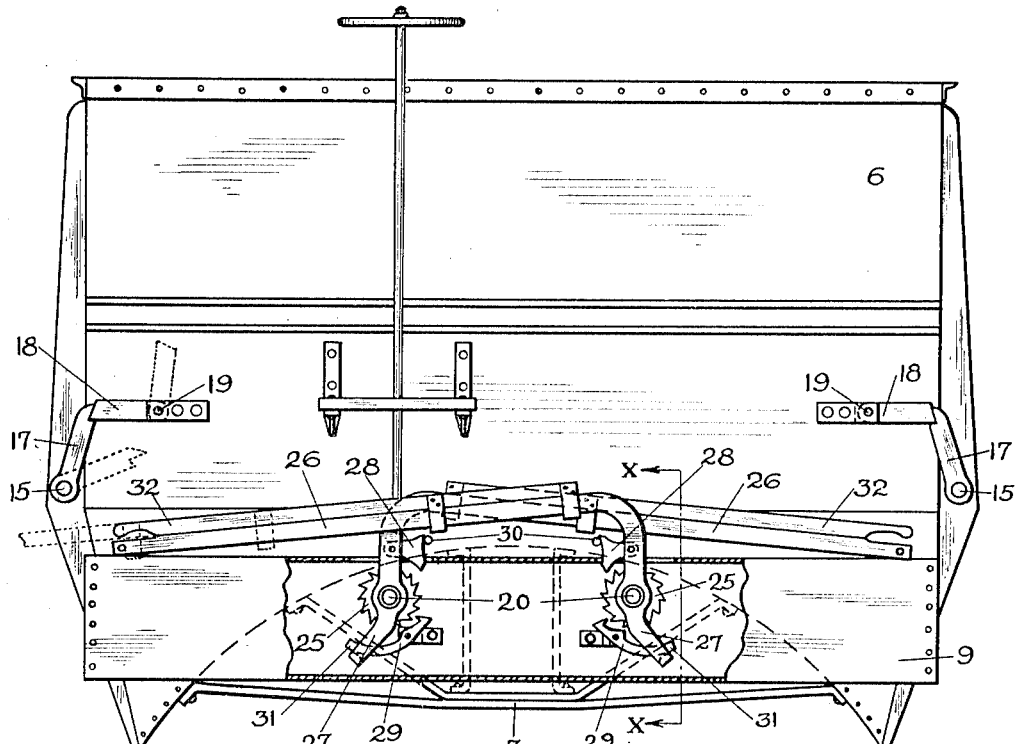
Figure 2:
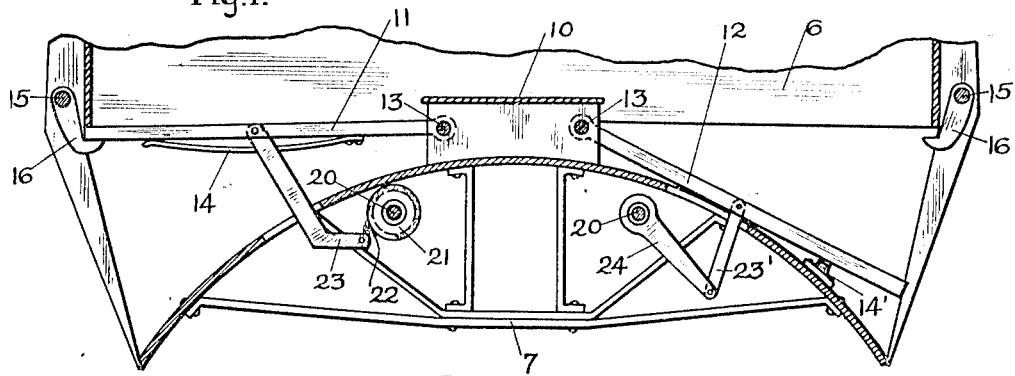

The invention will be best understood by reference to the accompanying drawings forming a part of this specification, and in which, Figure 1 is an end elevation of the car built in accordance with my invention, Fig. 2, is a transverse vertical section of the same, Fig. 3 is a fragmental side elevation of such a car, Fig. 4 is an elevation of a modified form of bumper spring used in my device, and Fig. 5 illustrates the looped end of the door closing lever and the ratchet wheel connection.

The preferred form of construction as illustrated in the drawings comprises a car 6 having the conventional strengthening frame 7 and truck 8. The car 6 is provided with a hollow bumper beam 9 formed of sheet metal and part of the actuating mechanism of my device is mounted in the hollow of said beam. The car is provided with a narrow bottom portion 10 extending longitudinally thereof thereby forming longitudinal openings on each side of said middle bottom portion and provided with doors 11 pivoted, as at 13, to close one of said longitudinal bottom openings and a set of doors 12 pivoted as at 13 to close the other of such longitudinal bottom openings. The plurality of doors 11 and 12 are of like construction and operation so that the description of one set and their actuating means will suffice for both. Each of said doors is provided with a bumper spring 14 secured on its under side in a manner to engage the frame work 7 of the car to relieve the impact when the doors are dropped. A modified form 14' of this bumper spring is shown in Fig. 4 and its application to the device is shown in Fig. 2.

Shafts 15 are extended longitudinally of the car 6 near the outer edge of the longitudinal bottom openings of the car and provided with a plurality of locking catches 16 secured rigidly thereon. Such locking catches 16 are formed in a manner to engage the outer edges of the doors 11 and 12 when in their closed positions, to lock them in such positions. On the end of each of shafts 15 on the outside of the car is provided a lever 17 secured rigidly thereon and each of said levers is provided with a notch in its end portion into which is swung the arm 18 to engage the arm 17 to lock the locking catches 16 on the doors, as described. The arm 18 is pivoted to the car body 6 as at 19.

A rotatable shaft 20 is journaled in the car frame 7 under the doors 11 in a position substantially, as indicated in Figs. 1 and 2 and provided thereon with drums 21. Chains 22 are wound around the drums 21 and connected to the doors 11 by means of a connecting rod 23 to close said doors.

A modified form of door closing means is provided when so desired, in this form a lever 24 is substituted for the drum 21 and chain 22 and connected with the doors 11 and 12 by means of a suitable connecting rod 23'.

On the ends of the shafts 20 are ratchet wheels 25 and pivoted on said shafts 20 in proximity with the ratchet wheels 25 are levers 26 and said levers are formed with their pivotal ends 27 looped, as indicated in Fig. 5 thereby engaging the shaft on both sides of the sprocket wheels 25. Pivoted on the levers 26 are pawls 28 to engage the ratchet wheels to turn the shafts in a direction to close the doors 11 and 12. The levers 26 will not have sufficient throw for closing the doors at one stroke and the pawls 29 pivoted on the frame 7 are adapted to engage the ratchet wheels 25 to prevent backward turning of the shafts 20. In this manner the levers 26 are moved downwardly to tighten the door closing mechanism and the catches 29 hold the shafts until a new point on the ratchet wheels are engaged by the pawls 28 to take a new hold on said ratchet.

Suitable stops 30 are provided on the car 6 to engage the pawls 28 as soon as the doors have been closed to disengage said pawls from their sprocket wheels. The looped ends of the levers 26 are also formed in a manner to engage the free end portions of the pawls 29 to disengage said pawls from the ratchet wheels at the same time that the pawls 28 are disengaged to allow the shaft and door closing mechanism to become freed. When it is desired to unload the car the arm 18 is raised to the dotted line position indicated in Fig. 1 and the arm 17 thrown to its dotted line position, in the same figure to unlock the locking catches 16 to free the doors 11 and 12 and the load will force the doors downwardly by gravity and slide out of the car over said doors and be deposited on the outside of the railway track. When it is desired to close these doors again the levers 26 are manually operated to close the doors already described. The levers 26 are provided with extension portions 32 slidably secured thereon to increase their length to obtain greater leverage when it is so desired to raise the doors 11 and 12.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the kind described comprising a car; a set of emptying doors pivoted on each side of said car; a shaft extending longitudinally of said car under each of said sets of doors; means on one of said shafts connected to each of said doors in one set to close such doors simultaneously with each other; means on the other of said shafts connected to each of said doors in the other set to close such doors simultaneously with each other; a ratchet wheel on each of said shafts; a lever on each of said shafts in proximity with said ratchet wheels; a pawl pivoted on each of said levers to engage its coöperating ratchet wheel; a second pawl pivoted on said car to engage each coöperating ratchet wheel; locking shafts journaled along the outer edges of said doors on the outer sides of said car and locks on said locking-shafts locking each of said doors as soon as they are closed, substantially as described.

2. A device of the kind described comprising a car; a set of emptying doors pivoted on each side of said car; a shaft extending longitudinally of said car under each of said sets of doors; means on one of said shafts connected to each of said doors in one set to close such doors simultaneously with each other; means on the other of said shafts connected to each of said doors in the other set to close such doors simultaneously with each other; a ratchet wheel on each of said shafts; a lever on each of said shafts in proximity with said ratchet wheels; a pawl pivoted on each of said levers to engage its coöperating ratchet wheel; pawls pivoted on said car to engage each coöperating ratchet wheel; stops on said car for disengaging the pawls pivoted on said levers; and bent portions on said levers for disengaging the pawls on said car from said ratchet wheels, substantially as described.

3. A device of the kind described comprising a car; a set of emptying doors pivoted on each side of said car; a door closing shaft extending longitudinally of said car under each of said sets of doors; means on one of said shafts connected to each of said doors in one set to close such doors simultaneously with each other; means on the other of said shafts connected to each of said doors in the other set to close such doors simultaneously with each other; a locking shaft on each side of said car and extended longitudinally thereof; locks on one of said locking shafts for locking one set of doors simultaneously; locks on the other of said locking shafts to lock the other set of doors simultaneously; a lever on each of said locking shafts having a notch in its free end; arms pivoted on said car engaging said notches to lock said locks; a ratchet wheel secured on each of said door closing shafts; a lever on each of said shafts in proximity with said ratchet wheels; a pawl on each of said levers to engage said ratchets; a second pawl on said car to engage each of said ratchets to prevent backward movement of said ratchet wheels before said doors are closed; stops on said car to automatically disengage the pawls on said levers from their coöperating ratchet wheels; looped ends on said levers to disengage the pawls pivoted on said car from engagement with their coöperating ratchet wheels, substantially as described.

4. A device of the kind described comprising a car; a set of emptying doors pivoted on each side of said car; a door closing shaft extending longitudinally of said car under each of said sets of doors; means on one of said shafts connected to each of said doors in one set to close such doors simultaneously with each other; means on the other of said shafts connected to each of said doors in the other set to close the doors of such set simultaneously with each other; levers, each provided with a looped end and journaled through such loop end on one of said shafts; ratchet wheels, each secured on one of said shafts between the side portions of the looped end of one of said levers;

pawls, each pivoted to one of said levers in its looped end to coöperate with one of the ratchet wheels; pawls pivoted on said car to coöperate with said ratchet wheels and adapted to engage the looped end of said levers to move such pawls from coöperative engagement with said ratchet wheels; and stops on said car to move the pawls pivoted on said levers from coöperative engagement with said ratchet wheels, substantially as described.

In testimony whereof I have signed my name to this specification in the presence of two subscribing witnesses.

RICHARD W. ERICSON.

Witnesses:
ARTHUR A. OLSON,
JOSHUA R. H. POTTS.

Copies of this patent may be obtained for five cents each, by addressing the "Commissioner of Patents, Washington, D. C."